(12) United States Patent
Skvorecz

(10) Patent No.: US 11,185,187 B2
(45) Date of Patent: Nov. 30, 2021

(54) WIRE CHAFING STAND LABEL

(71) Applicant: Robert J. Skvorecz, Kinnelon, NJ (US)

(72) Inventor: Robert J. Skvorecz, Kinnelon, NJ (US)

( * ) Notice: Subject to any disclaimer, the term of this patent is extended or adjusted under 35 U.S.C. 154(b) by 8 days.

(21) Appl. No.: 16/800,493

(22) Filed: Feb. 25, 2020

(65) Prior Publication Data

US 2021/0259461 A1 Aug. 26, 2021

(51) Int. Cl.
*A47J 36/34* (2006.01)
*B65D 6/08* (2006.01)

(52) U.S. Cl.
CPC ............... *A47J 36/34* (2013.01); *B65D 7/20* (2013.01)

(58) Field of Classification Search
CPC .................................. A47J 36/34; B65D 7/20
USPC ......... 248/465.1, 153, 175, 218.1, 249, 302; 40/32, 659, 606.11, 744, 661, 666
See application file for complete search history.

(56) References Cited

U.S. PATENT DOCUMENTS

| | | | |
|---|---|---|---|
| 4,240,549 A * | 12/1980 | Hogg ....................... | A47F 13/00 206/303 |
| 6,105,295 A * | 8/2000 | Brinkman ............... | G09F 3/204 248/214 |
| 2005/0076554 A1 * | 4/2005 | Fast .......................... | G09F 3/16 40/661 |
| 2006/0117627 A1 * | 6/2006 | Fast ........................ | G09F 3/204 40/642.01 |
| 2007/0245611 A1 * | 10/2007 | McDonald .............. | G09F 3/204 40/661.03 |
| 2014/0208625 A1 * | 7/2014 | Kirby ...................... | G09F 3/204 40/658 |
| 2016/0280417 A1 * | 9/2016 | Skvorecz ................. | B65D 7/20 |
| 2018/0108279 A1 * | 4/2018 | Balser ..................... | G09F 3/201 |

* cited by examiner

*Primary Examiner* — Muhammad Ijaz
(74) *Attorney, Agent, or Firm* — Michael J. Feigin, Esq.; Feigin and Fridman LLC

(57) ABSTRACT

A wire chafing stand of embodiments of the disclosed technology has an upper enclosed rim, a lower enclosed rim, and a detachable sign. The detachable sign has an elongated planar structure with front and rear sides. The front side has visible indicia. The rear side has an attachment mechanism sized to be removably attachable to the lower enclosed rim. This detachable sign is at an acute angle to a plane which is circumscribed by the lower enclosed rim in some embodiments of the technology. The sign has a bottom and top side between the front side and rear side. In some embodiments of the technology, this bottom side is adapted to rest against a same surface as the wire chafing stand rests, allowing the sign to be held/to rest at an acute angle while simultaneously being attached to and/or resting on the lower enclosed rim.

19 Claims, 7 Drawing Sheets

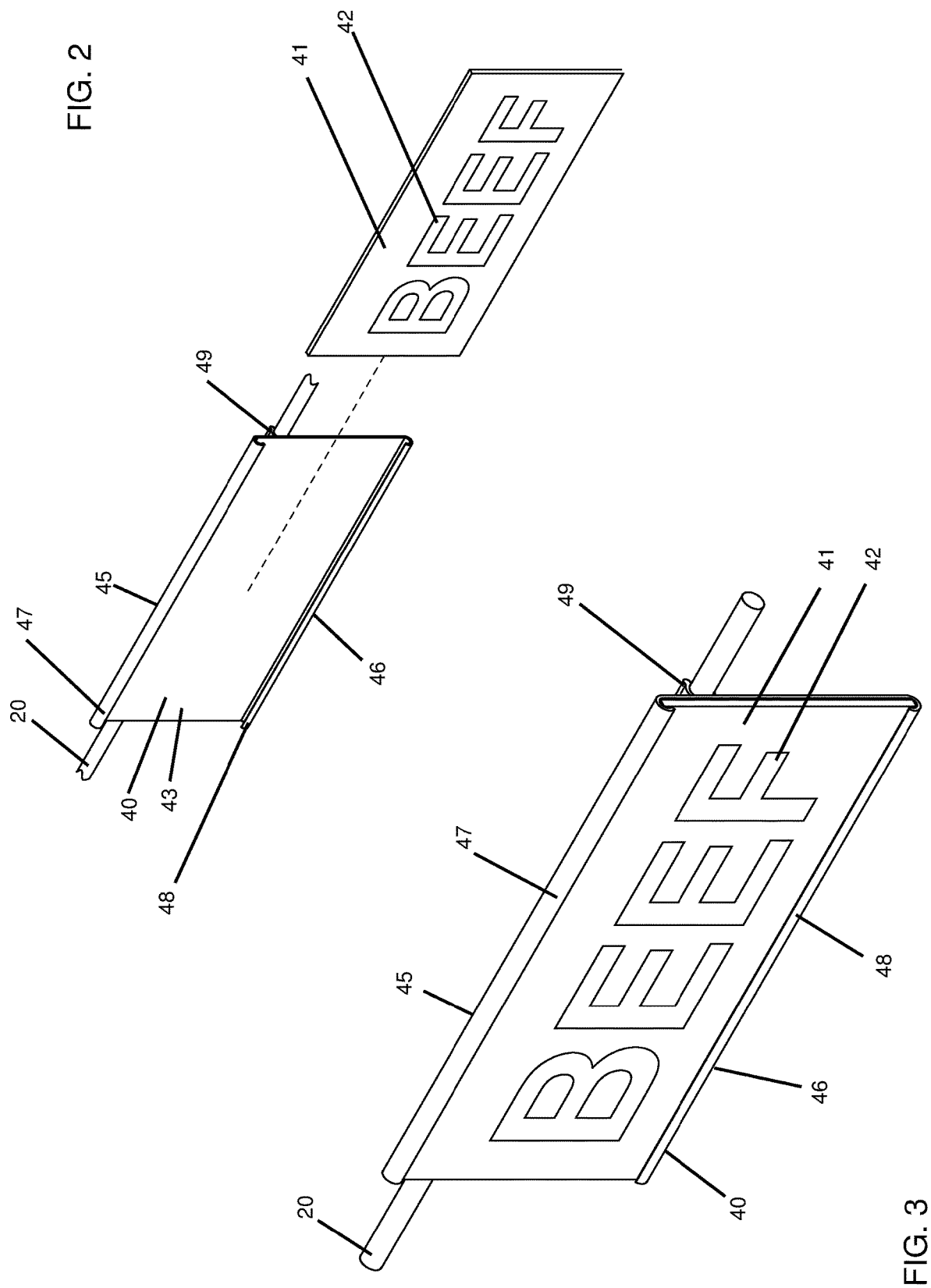

WIRE CHAFING STAND LABEL

FIELD OF THE DISCLOSED TECHNOLOGY

The disclosed technology relates to a wire chafing stand label, more specifically, to a wire chafing stand label which is secure and easy to see and read.

BACKGROUND OF THE DISCLOSED TECHNOLOGY

Chafers and chafing stands are used to hold pans, often with a heating device held below the pan. Catering establishments and restaurants often use such devices when keeping food warm at a location other than where the food was initially prepared. For example, chafers are used in places such as banquet halls and the like, where large amounts of food are constantly being served.

The chafers, often in the form of rectangular metal receptacles, are of a normally standard dimensional size and are filled with food to be heated and/or served. Chafers are commonly supported upon transportable wire stands during both heating and serving, with each of the wire stands being hereinafter referred to as a "wire chafing stand" and often being composed of steel. A wire chafing stand of the prior art, as exemplified by U.S. Pat. No. 5,921,513, issued to Robert Skvorecz, is a relatively simple structure having an upper rim and a lower rim formed of respective larger and smaller rectangular wire structures around a respective rectangular opening. The upper and lower rims are connected to each other by way of wire legs to form a frusto-pyramidical structure dimensioned to hold and support a chafer containing food. The wire legs are typically welded to the upper and lower rims at the corners of the structure, with the wire legs extending below the lower rim, so that they also function as bottom supports to keep the stand level with the ground and to maintain the lower rim at a predetermined height above ground level for placement of chafing fuel heaters for the chafing dish in the stand.

In locations which use chafer stands, especially those which use multiple stands, those present who will be eating food held by the stands frequently do not know what is being served. The stands allow for a tray of food which may be left covered to preserve warmth. Even if the food is left uncovered, it can be difficult to identify the contents of a tray by sight. A catering establishment or restaurant may attempt to rectify this problem by placing food labels near trays, but this is often mildly effective at best. The labels are easily jostled or knocked over as the food is served. This is especially true if the stands are being used to serve food at a self-serve buffet, as is often the case. Additionally, such labels can be difficult to see or go entirely unnoticed by patrons, rendering the effectiveness thereof moot.

SUMMARY OF THE DISCLOSED TECHNOLOGY

There is therefore a need in the art to provide a wire chafing stand label which is more secure and effective than known in the prior art.

A wire chafing stand of embodiments of the disclosed technology has an upper enclosed rim, a lower enclosed rim, and a detachable sign. The detachable sign has an elongated planar structure with a front side and rear side. The front side, in embodiments of the disclosed technology, has visible indicia. The rear side has an attachment mechanism sized to be removably attachable to the lower enclosed rim. The term "planar structure" is defined as "a substantially flat shape."

This detachable sign is at an acute angle, such as a 45 degree angle, to a plane which is circumscribed by the lower enclosed rim in some embodiments of the technology. The sign has a bottom side and top side between the front side and rear side. In some embodiments of the technology, this bottom side is adapted to rest against a same surface as the wire chafing stand rests (e.g. a top surface of a table), allowing the sign to be held/to rest at an acute angle while simultaneously being attached to and/or resting on the lower enclosed rim. The term "acute angle" is defined as "an angle less than 90 degrees." The term "a plane which is circumscribed by the lower enclosed rim" is defined as "a flat, 2-dimensional surface whose boundaries are defined by the lower enclosed rim."

In some embodiments of the technology, the attachment mechanism can be at a top side of, substantially at a top side of, or between the bottom and top sides of, the elongated planar structure of the detachable sign, or the attachment mechanism can be at a distance from the top side of the elongated planar structure of the detachable sign which includes a significant minority of the elongated planar structure of the detachable sign. "Significant minority" is defined as "between 5% and 33.3% of the total length thereof."

In the specification, "top" is defined as "typically further from the surface upon which the stand rests" or "furthest away from a direction of a pull of gravity/a center of the Earth when used in a typical manner as the stand is designed." "Bottom" is defined as "typically closer to the surface upon which the stand rests when the stand is used as designed" or "closest to the direction of the pull of gravity/closest to the center of the Earth when used in a typical manner."

In some embodiments of the technology, a portion of the detachable sign extends above a plane circumscribed by the lower enclosed rim at an angle to the plane circumscribed by the lower enclosed rim. In some embodiments of the technology, the detachable sign rests against a surface on which the legs of the wire chafing stand also rest, the legs being attached to the lower enclosed rim of the stand.

The attachment mechanism on the stand is, in some embodiments, a semi-circular connector with resilient ends which deform while attaching to the lower enclosed rim. "Resilient" is defined as "returning to an original shape after being deformed." The term "deform" is defined as "gaining a distorted or changed shape."

In some embodiments of the technology, the detachable sign has curvilinear flanges at each end of the elongated planar structure which extend away from the elongated planar structure in an opposite direction of the attachment mechanism. The flanges are sized to hold a plate with indicia there-between. The plate with indicia, which can be held between the flanges and the elongated planar structure, is slidable, in some embodiments, in a direction which is perpendicular to the vertical direction of the elongated planar structure. The term "curvilinear flange" is defined as "projecting rim or lip which is curved." The term "vertical" is defined as "the direction which extends at a right angle from the bottom side of the detachable sign."

Described another way, a kit of embodiments of the disclosed technology has a wire chafing stand and detachable sign, including a wire chafing stand with bottom feet and at least a lower rim attached to the bottom feet, and a detachable sign with an attachment mechanism on a rear side adapted to attach the detachable sign to the lower rim. In some embodiments of this kit, a distance between the attachment mechanism and a lower most extremity of said sign is greater than a distance between the lower rim and a lower most extremity of the bottom feet.

The attachment of the detachable sign to the lower enclosed rim of the wire chafing stand by way of the attachment mechanism causes the detachable sign to rest at an acute angle to a ground. The bottom feet and the detachable sign both rest on the ground. The term "ground" is defined as "the surface upon which the wire chafing stand and the sign are resting."

In some embodiments of the technology, the attachment mechanism comprises rigid and oppositely-disposed spaced-apart curved flanges which become temporarily further spaced apart from each other when attaching around the lower enclosed rim. The attachment mechanism is located on an opposite side of the detachable sign relative to indicia, such as indicia on a slidable plate, the plate in embodiments of the disclosed technology being of a rectangular shape. "Oppositely-disposed spaced-apart curved flanges" are curved flanges which are placed parallel to one another such that the flanges curve toward the same point which lies there-between.

In some embodiments of the technology, when the wire chafing stand and the detachable sign are attached to each other via the attachment mechanism, the detachable sign is partially within and partially outside of a space above an opening which is circumscribed by the lower rim. "A space above an opening which is circumscribed by the lower rim" is used here to refer to a space with a lower border which is defined by the plane circumscribed by the lower enclosed rim of the stand.

Any device or step to a method described in this disclosure can comprise or consist of that which it is a part of, or the parts which make up the device or step. The term "and/or" is inclusive of the items which it joins linguistically and each item by itself. "Substantially" is defined as at least 95% of the term being described and/or "within a tolerance level known in the art and/or within 5% thereof. Any device or aspect of a device or method described herein can be read as "comprising" or "consisting" thereof.

BRIEF DESCRIPTION OF THE DRAWINGS

FIG. 2 shows a top and front perspective view of the sign of FIG. 1 with detached plate in an embodiment of the disclosed technology.

FIG. 3 shows a top and front perspective view of the sign of FIG. 1 in an embodiment of the disclosed technology.

DETAILED DESCRIPTION OF EMBODIMENTS OF THE DISCLOSED TECHNOLOGY

A wire chafing stand of embodiments of the disclosed technology has an upper enclosed rim, a lower enclosed rim, and a detachable sign. The detachable sign has an elongated planar structure with a front side and rear side. The front side, in embodiments of the disclosed technology, has visible indicia. The rear side has an attachment mechanism sized to be removably attachable to the lower enclosed rim. This detachable sign is at an acute angle, such as a 45 degree angle, to a plane which is circumscribed by the lower enclosed rim in some embodiments of the technology. The sign has a bottom and top side between the front side and rear side. In some embodiments of the technology, this bottom side is adapted to rest against a same surface as the wire chafing stand rests (e.g. a top surface of a table), allowing the sign to be held/to rest at an acute angle while simultaneously being attached to and/or resting on the lower enclosed rim.

Embodiments of the disclosed technology will become more clear in view of the following description of the drawings.

Figure 1:
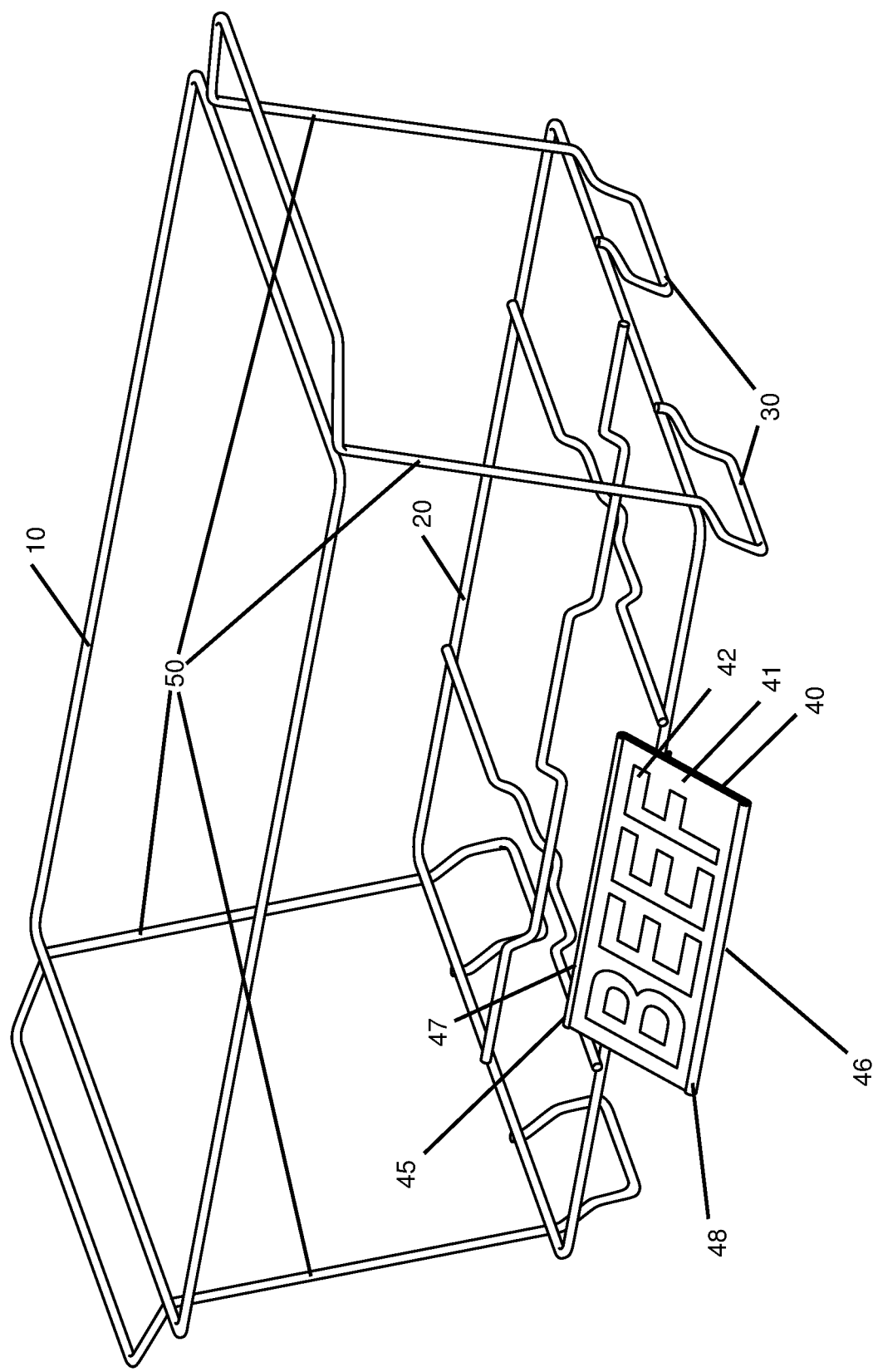
FIG. 1 shows a top and front perspective view of a wire chafing stand and sign in an embodiment of the disclosed technology.

FIG. 1 shows a top and front perspective view of a wire chafing stand and sign in an embodiment of the disclosed technology. An upper enclosed rim 10 connects to vertical wires 50, the vertical wires 50 also connecting to a lower enclosed rim 20. The upper enclosed rim 10 and lower enclosed rim 20 can be of similar shape to each other. The vertical wires 15 continue past the lower enclosed rim 20 and form legs 30 which rest upon the ground 1 in an embodiment of the disclosed technology. A leg 30 can connect as described, or be any form of support structure which holds the rest of the wire chafing stand there-above.

The sign 40 is removably connected to the lower enclosed rim 20 via an attachment mechanism, such as a semi-circular connector 49. The sign 40 and the leg or legs 30 thus rest on the ground 1 at a same height as each other in embodiments of the disclosed technology. The sign 40, in this embodiment, rests at an acute angle to the ground 1 and/or the lower enclosed rim 20. The sign 40 further rests on the lower enclosed rim 20 at an angle to the plane circumscribed by the lower enclosed rim 20 in an embodiment of the disclosed technology (e.g. the sign is at an acute angle to a most elongated length of the rim 20). The bottom side 46 of the sign 40 rests on the ground 1 and the top side of the sign 45 extends into a space above an opening which is circumscribed by the lower rim 20 in an embodiment of the disclosed technology. A slidable plate 41 with visible indicia 42 is placed in front of the sign 40 and held in place using curvilinear flanges 47 and 48 in an embodiment of the disclosed technology.

FIG. 2 shows a top and front perspective view of the sign of FIG. 1 with detached plate in an embodiment of the disclosed technology. The slidable plate 41 is removable from the sign 40 in an embodiment of the disclosed technology. The plate 41 has visible indicia 42, which can be used to provide a description of the contents of the tray being held by the wire chafing stand (e.g. the indicia could read "BEEF," "LAMB," or whatever other food is being held by the stand) in an embodiment of the disclosed technology. The plate 41 slides into and out of place on the sign 40 horizontally to the left and/or right (relative to the sign) in an embodiment of the disclosed technology. When in place, the plate 41 covers a significant majority of the front face of the sign 43 in an embodiment of the disclosed technology.

In another embodiment of the disclosed technology, the sign 40 is constructed in such a way that the curvilinear flanges 47 and 48 connect to the left and right sides of the sign 40 rather than the top side 45 and bottom side 46, such that the plate 41 can be inserted by being slid into the sign 40 vertically rather than horizontally. In another embodiment of the disclosed technology, the curvilinear flanges 47 and 48 are shorter than the length of sign 40 and/or are made of multiple spaced-apart sections. In another embodiment of the disclosed technology, the planar section of the sign 40, which connects to the curvilinear flanges 47 and 48 and to the semi-circular connector 49, and which supports the plate 41, is replaced with a wire frame or other similar piece. In another embodiment of the disclosed technology, the plate 41 is held in place by a tray attached to the bottom side of the sign 46, and/or by hooks attached to the top side of the sign 45, and/or by some other form of connector. In another embodiment of the disclosed technology, the combination of the sign 40 and the plate 41 which has visible indicia 42 is replaced with a single removable sign 41 which has visible indicia 42 and no curvilinear flanges 47 and 48.

FIG. 3 shows a top and front perspective view of the sign of FIG. 1 in an embodiment of the disclosed technology. The slidable plate 41 shown here is slid between the curvilinear flanges 47 and 48 of the sign 40 and held in place by the curvilinear flanges 47 and 48 in an embodiment of the disclosed technology. In other embodiments, the indicia 42 and/or slidable plate 41 are integrated into the sign 40 as a single piece or attached together by other fastening mechanisms such as screws or glue. The curvilinear flanges 47 and 48 extend seamlessly out of and/or form a unitary structure with the top side 45 and bottom side 46 of the sign 40 in an embodiment of the disclosed technology. In another embodiment of the disclosed technology, the flanges are bent rather than curved, using one or more bends, and the edges of the plate 41 are shaped and fitted to match. "Curve" or "curved" is defined as "a line which gradually deviates from being straight", whereas "bend" is defined as "a line which turns at an abrupt angle of at least 5 degrees."

Figure 4:
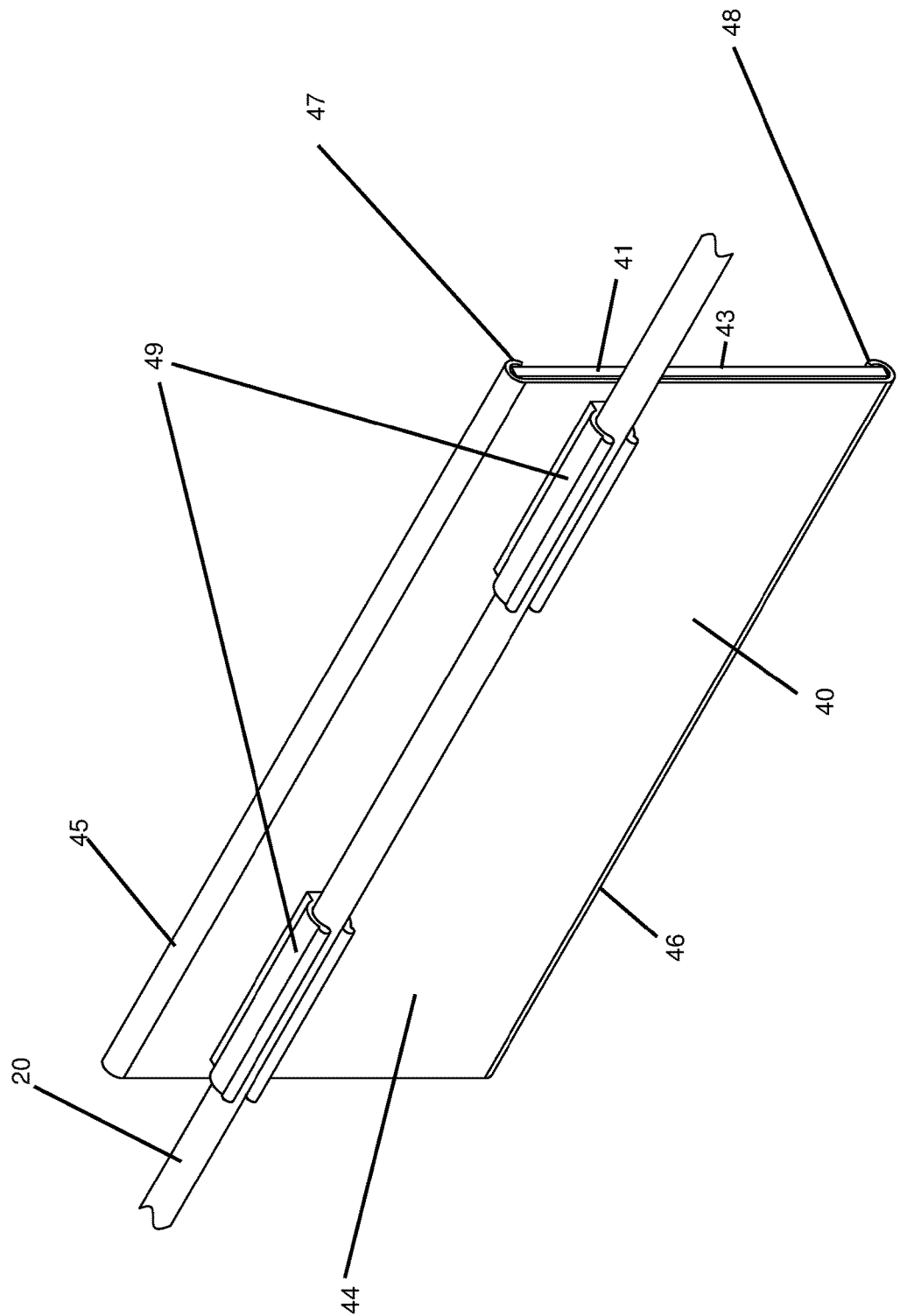
FIG. 4 shows a top and rear perspective view of the sign of FIG. 1 in an embodiment of the disclosed technology.

FIG. 4 shows a top and rear perspective view of the sign of FIG. 1 in an embodiment of the disclosed technology. The sign 40 is removably connected to the lower enclosed rim 20 by the semi-circular connectors 49 in an embodiment of the disclosed technology. The connection is such that the sign 40 may be removed to allow for changing the slidable plate 41 with another same-sized plate with different indicia in an embodiment of the disclosed technology. Additionally, the connection allows the lower rim 20 to act as a fulcrum point on which the sign 40 can be rotated in order to rest on the ground 1 at an acute angle. The semi-circular connectors 49 are deformable, e.g. each semi-circular half of the connector 49 shifts further apart to allow a wire to be pushed past an opening there-between and returns to its original shape when no force continues to push the halves of the connectors 49 apart, such as when the connectors 49 are removably attached to a wire of the lower enclosed rim 20. In some embodiments of the disclosed technology, the connection is made using connectors of various lengths and in various quantities. In some embodiments of the disclosed technology, the connectors 49 are placed at various locations on the rear of the elongated planar structure of the sign 41 while remaining parallel to the lower enclosed rim 20. In another embodiment of the disclosed technology, the sign 40 and plate 41 are of a shape and length which allows the sign to rest on the ground 1 at a right angle and/or at an obtuse angle.

Figure 5:
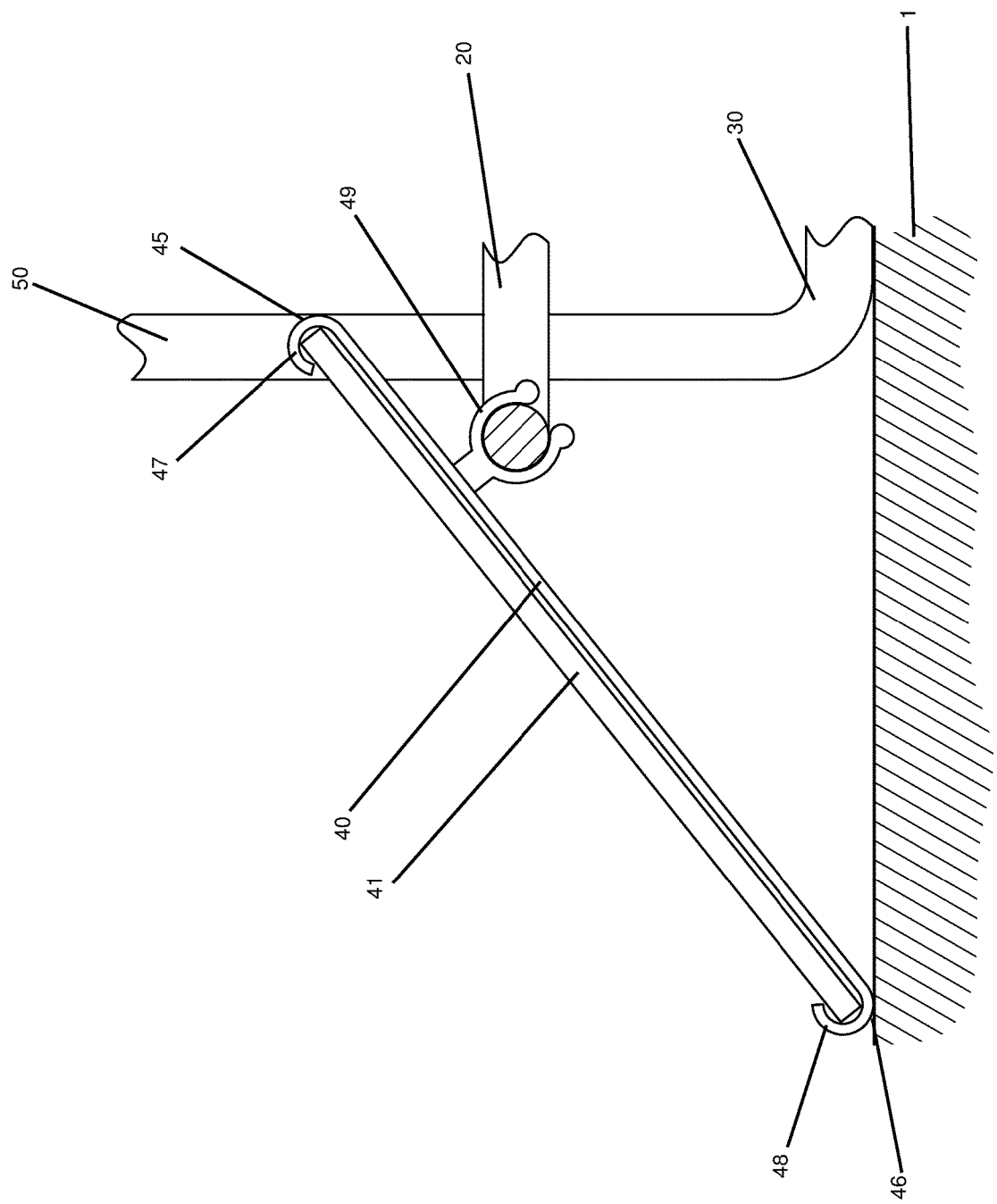
FIG. 5 shows a right side view of the sign of FIG. 1 in an embodiment of the disclosed technology.

FIG. 5 shows a right side view of the sign of FIG. 1 in an embodiment of the disclosed technology. The sign 40 is removably connected to the lower rim 20. The plate 41 is inserted into the sign 40 and is being held in place by the curvilinear flanges 47 and 48 in an embodiment of the disclosed technology. The sign 40 rests on the ground 1 and the lower enclosed rim 20 at an acute angle, with the bottom side 46 resting on the ground 1 and the top side 45 extending into the area above the lower rim 20 in an embodiment of the disclosed technology. The semi-circular connectors are attached to the rear side 44 of the planar structure of the sign 40 by way of an extended rectangular prism which connects to the substantial midpoint of the semi-circular connector 49 in an embodiment of the disclosed technology. In some embodiments of the disclosed technology, the connection between the semi-circular connectors 49 and the sign 40 is made using rectangular prisms of different dimensions and/or using differently-shaped prisms.

Figure 6:
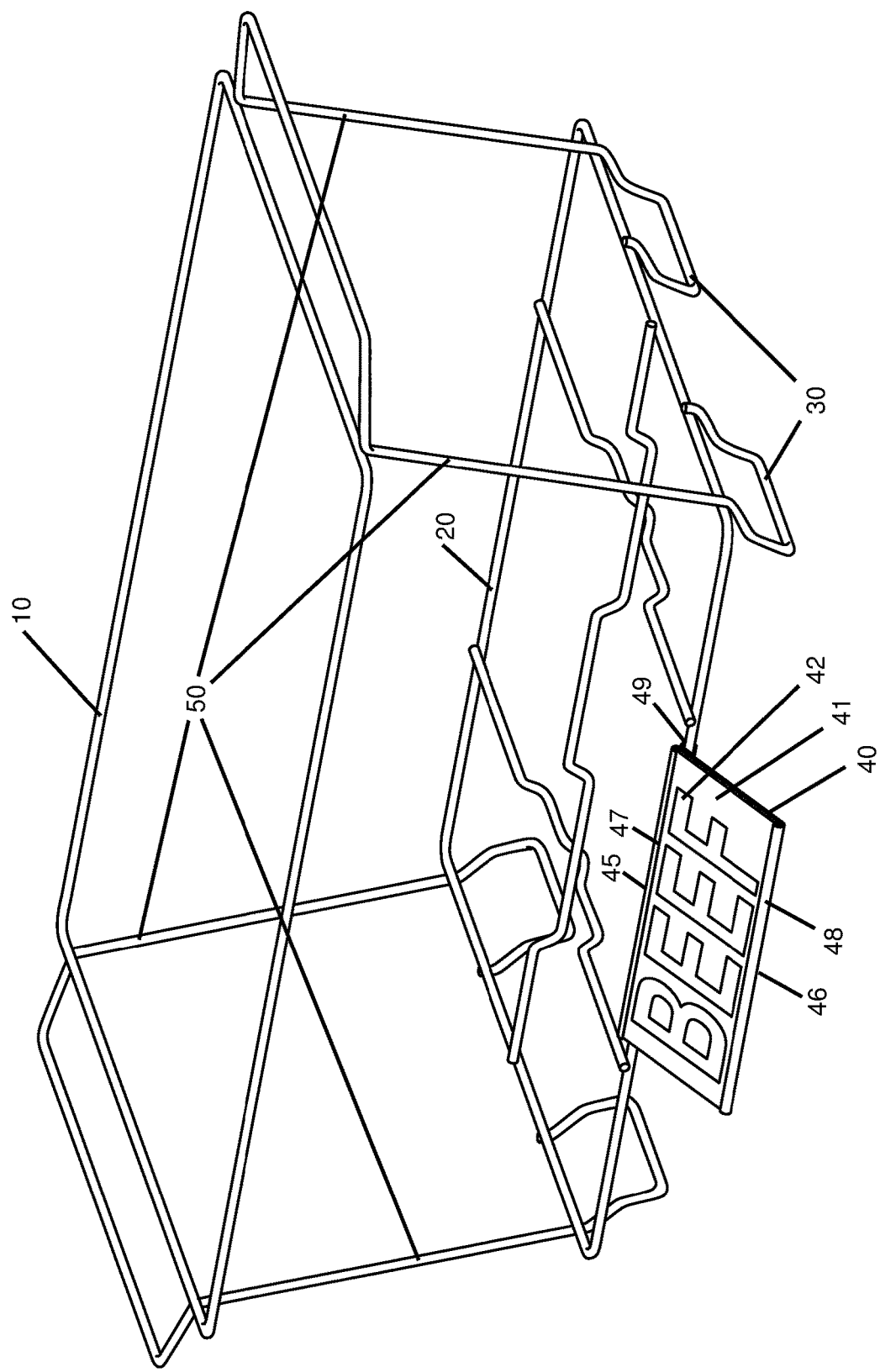
FIG. 6 shows a top and front perspective view of the wire chafing stand and sign in another embodiment of the disclosed technology.

FIG. 6 shows a top and front perspective view of the wire chafing stand and sign in another embodiment of the disclosed technology. In the embodiment shown in FIG. 6, the sign 40 has an attachment mechanism 49 placed such that the sign 40 rests on the ground 1 at a more acute angle than in FIG. 1 in an embodiment of the disclosed technology. Additionally, in this embodiment of the disclosed technology, the top side of the sign 45 rests in front of the lower enclosed rim 20 rather than extending above and behind the lower enclosed rim 20 as in FIG. 1. By way of using one of a plurality of elongated planar structures with varied placement of the semi-circular connector 49, the acute angle between the sign 40 and ground 1, and/or between the sign 40 and lower enclosed rim 20, is varied as desired. This significantly increases the versatility of the disclosed technology by allowing a person or company using a sign on a wire chafing stand to do so in a variety of locations and with a variety of different sized wire chafing stands. Since the disclosed technology allows for such a variety of angles, the person or company using the wire chafing stand can place the removable label in such a way that takes into account the location of consumers at the event or buffet, the height of the wire chafing stand, the reflection of light on the label, etc., to best angle the sign 40 for optimal viewing.

Figure 7:
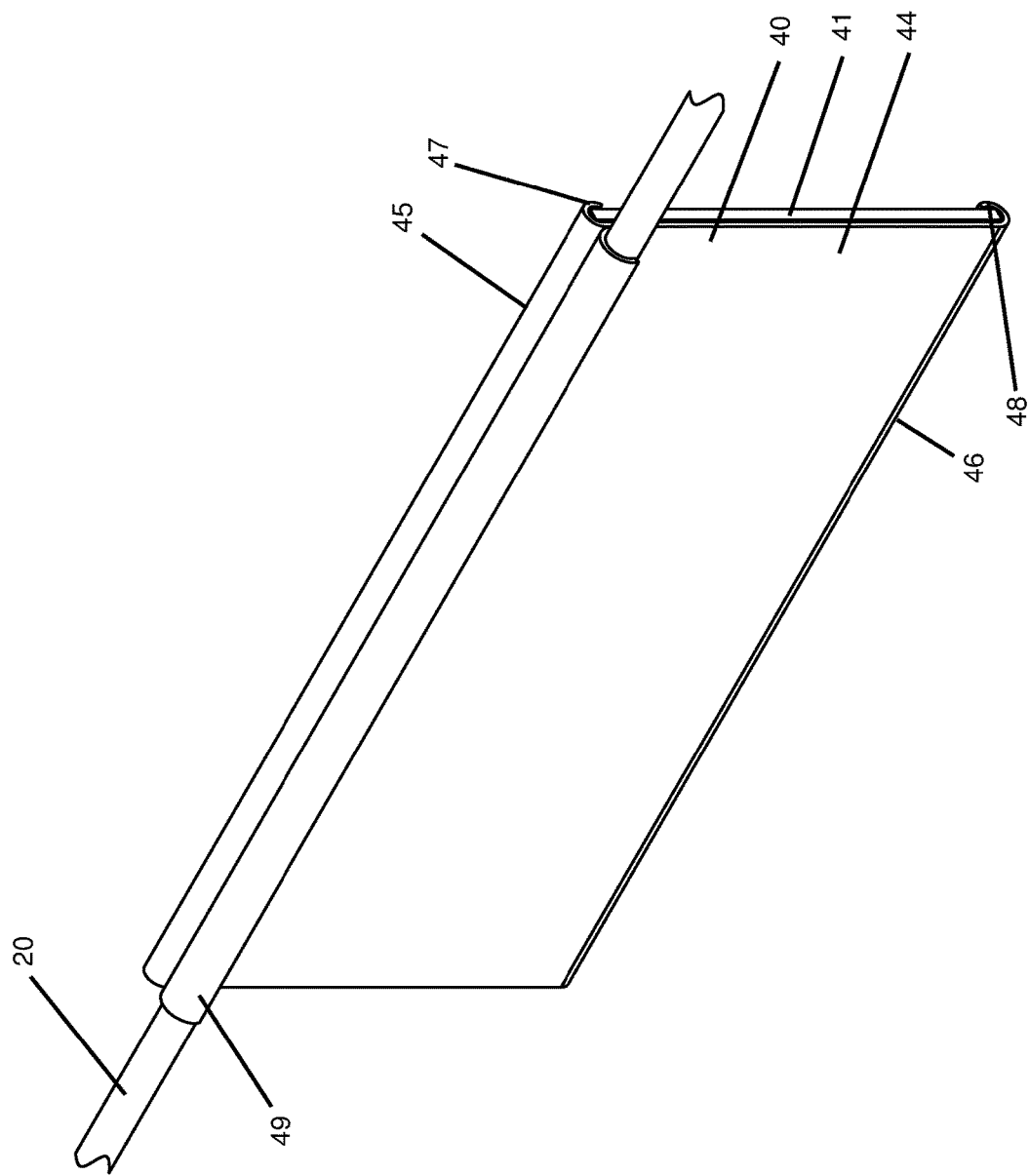
FIG. 7 shows a top and rear perspective view of the sign of FIG. 6 in an embodiment of the disclosed technology.

FIG. 7 shows a top and rear perspective view of the sign of FIG. 6 in an embodiment of the disclosed technology. In an embodiment of the disclosed technology, the semi-circular connector 49 is substantially a mirror image of the upper curvilinear flange 47, extending as a single unit across the entire length the sign 40. The semi-circular connector 49 connects to the top edge of the sign 45 rather than to a line along the rear side 44 of the planar structure of the sign 40 in this embodiment of the disclosed technology.

Figure 8:
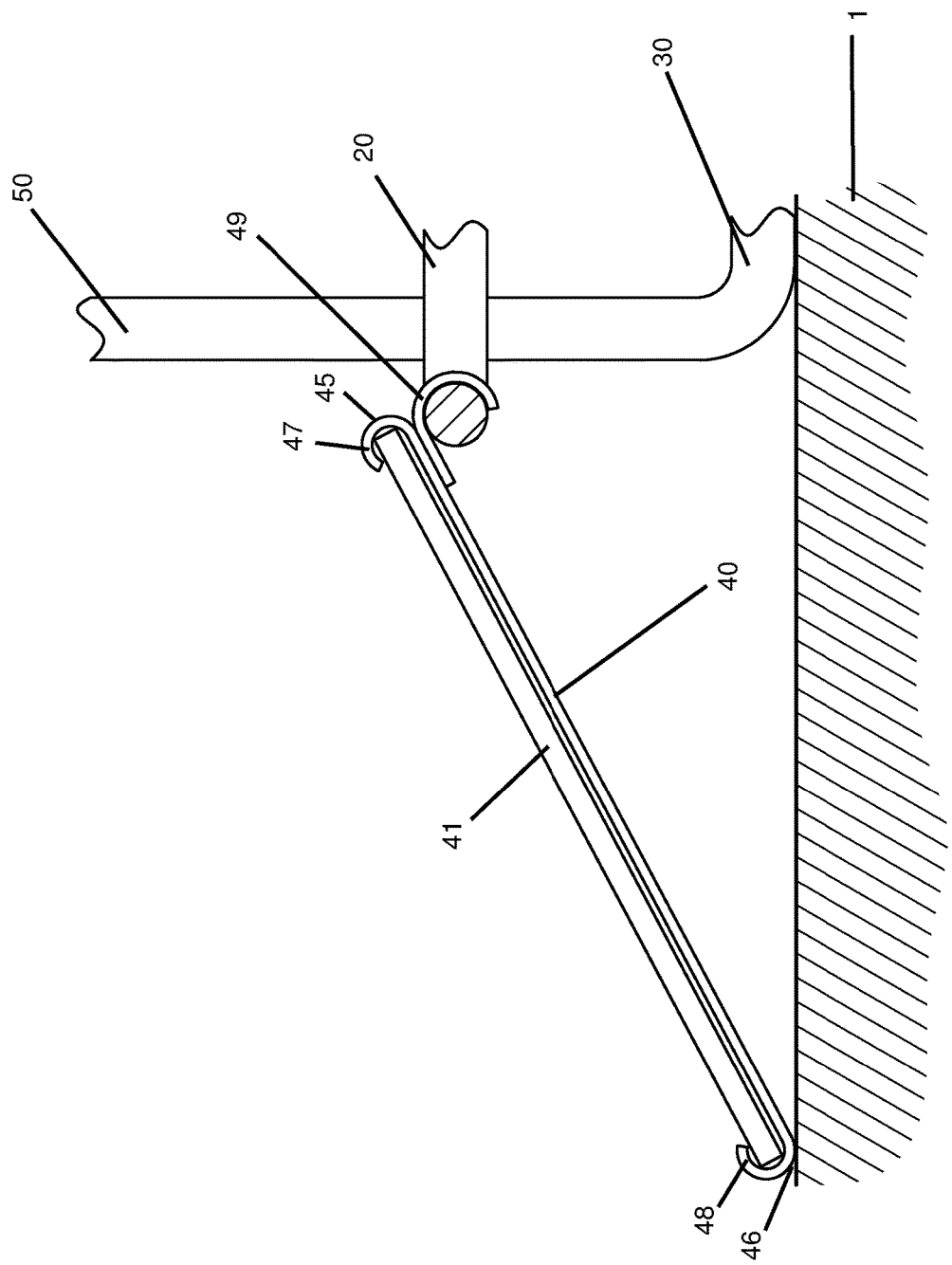
FIG. 8 shows a right side view of the sign of FIG. 6 in an embodiment of the disclosed technology.

FIG. 8 shows a right side view of the sign of FIG. 6 in an embodiment of the disclosed technology. In an embodiment of the disclosed technology, the semi-circular connector is attached to the rear side 44 of the planar structure of the sign 40 by way of a thin planar strip which extends sideways along the length of the sign 40 and extends vertically to connect to one of the bottom edges of the semi-circular connector 49. In another embodiment of the disclosed technology, the connection between the rear planar structure of sign 40 and the semi-circular connector 49 is made using a planar strip of different dimensions.

While the disclosed technology has been taught with specific reference to the above embodiments, a person having ordinary skill in the art will recognize that changes can be made in form and detail without departing from the spirit and the scope of the disclosed technology. The described embodiments are to be considered in all respects only as illustrative and not restrictive. All changes that come within the meaning and range of equivalency of the claims are to be embraced within their scope. Combinations of any of the methods, systems, and devices described herein-above are also contemplated and within the scope of the disclosed technology.

I claim:

1. A wire chafing stand comprising:
   an upper enclosed rim;
   a lower enclosed rim;
   a detachable sign, said detachable sign comprising:
   an elongated planar structure with a front side and rear side;
   said front side with indicia;
   said rear side, opposite said front side with an attachment mechanism sized to be removably attachable to said lower enclosed rim;
   wherein said elongated planar structure has a bottom and top side between said front side and said rear side;
   wherein said bottom side is adapted to rest against a surface on which said wire chafing stand rests such that said detachable sign is held at said acute angle while simultaneously being attached to said lower enclosed rim and resting on said surface;
   wherein said attachment mechanism is situated between said bottom and top side of said elongated planar structure of said detachable sign on a portion above a vertically middle point of said rear side thereof; and
   wherein said rear side of said detachable sign is substantially flat but for said attachment mechanism.

2. The wire chafing stand of claim 1, wherein said detachable sign is at the acute angle to a plane which is circumscribed by said lower enclosed rim.

3. The wire chafing stand of claim 2, wherein said acute angle is a 45 degree angle.

4. The wire chafing stand of claim 1, wherein said elongated planar structure is rotatable such that said bottom side rests on said surface while said detachable sign rests at substantially any angle relative to said surface within a range of substantially 70 degrees.

5. The wire chafing stand of claim 4, wherein said attachment mechanism is at said top side of said elongated planar structure of said detachable sign:
   wherein said rear side of said detachable sign is substantially flat.

6. The wire chafing stand of claim 1, wherein a distance from a vertically lowermost point of said attachment mechanism to said top side of said elongated planar structure of said detachable sign comprises a significant minority of said elongated planar structure of said detachable sign.

7. The wire chafing stand of claim 1, wherein a portion of said detachable sign extends above a plane defined by said lower enclosed rim.

8. The wire chafing stand of claim 1, wherein a portion of said detachable sign extends between said upper enclosed rim and said lower enclosed rim at an angle to each respective said upper and said lower enclosed rim.

9. The wire chafing stand of claim 8, wherein said bottom side of said detachable sign rests against a surface on which legs of said wire chafing stand rest, said legs attached to said lower enclosed rim:
   wherein a vertical distance between said surface and said legs is greater than a vertical distance between said surface and said bottom side of said detachable sign;
   wherein said detachable sign is configured to be resting on said surface at the acute angle thereto due to a vertical height between said lower rim of said wire chafing stand and said surface being less than a distance between said top side and said bottom side of said detachable sign, said detachable sign being removably attached to said lower rim.

10. The wire chafing stand of claim 1, wherein said attachment mechanism is a semi-circular connector with ends which deform while attaching to said lower enclosed rim.

11. The wire chafing stand of claim 10, wherein said detachable sign comprises curvilinear flanges at each end of said elongated planar structure which extend away from said elongated planar structure in an opposite direction of said attachment mechanism, said flanges sized to hold a plate with said indicia there-between.

12. The wire chafing stand of claim 11, further comprising a slidable plate with said indicia, said slidable plate held between said flanges and said elongated planar structure and slidable in a direction which is perpendicular to an angle of said elongated planar structure.

13. A kit comprising a wire chafing stand and detachable sign, comprising
   a wire chafing stand with bottom feet and at least a lower rim attached to said bottom feet;
   said detachable sign with an attachment mechanism on a back side adapted to rotatably attach said detachable sign to said lower rim;
   wherein a distance between said attachment mechanism and a lower most extremity of said sign is greater than a distance between said lower rim and a lowest most extremity of said bottom feet;
   wherein said bottom feet and said lower most extremity of said sign are configured to rest on a same surface.

14. The kit of claim 13, wherein by attachment of said detachable sign to said lower rim of said wire chafing stand by way of said attachment mechanism, said detachable sign is configured to rest at an acute angle relative to the ground due to a vertical height between said lower rim of said wire chafing stand and said ground being less than a distance between an top side and a bottom side of said detachable sign.

15. The kit of claim 14, wherein said bottom feet and said detachable sign rest on said ground.

16. The kit of claim 13, wherein said attachment mechanism comprises rigid and oppositely-disposed spaced-apart curved flanges which become temporarily further spaced apart from each other when attaching around said lower rim.

17. The kit of claim 16, wherein said attachment mechanism is disposed on an opposite side of said detachable sign compared to a slidable rectangular plaque with indicia thereon;
   wherein said slidable plaque is held between at least two oppositely-disposed flanges attached to said detachable sign and an elongated planar structure of said detachable sign and is slidable in a direction which is perpendicular to an angle of said elongated planar structure.

18. The kit of claim 13, wherein said wire chafing stand and said detachable sign are attached to each other via said attachment mechanism; and
   said detachable sign is partially within and partially outside of a space above an opening which is circumscribed by said lower rim.

19. The kit of claim 13, wherein said attachment mechanism has a back side which is simultaneously a part of said back side of said detachable sign.

* * * * *